United States Patent Office 3,426,548
Patented Feb. 11, 1969

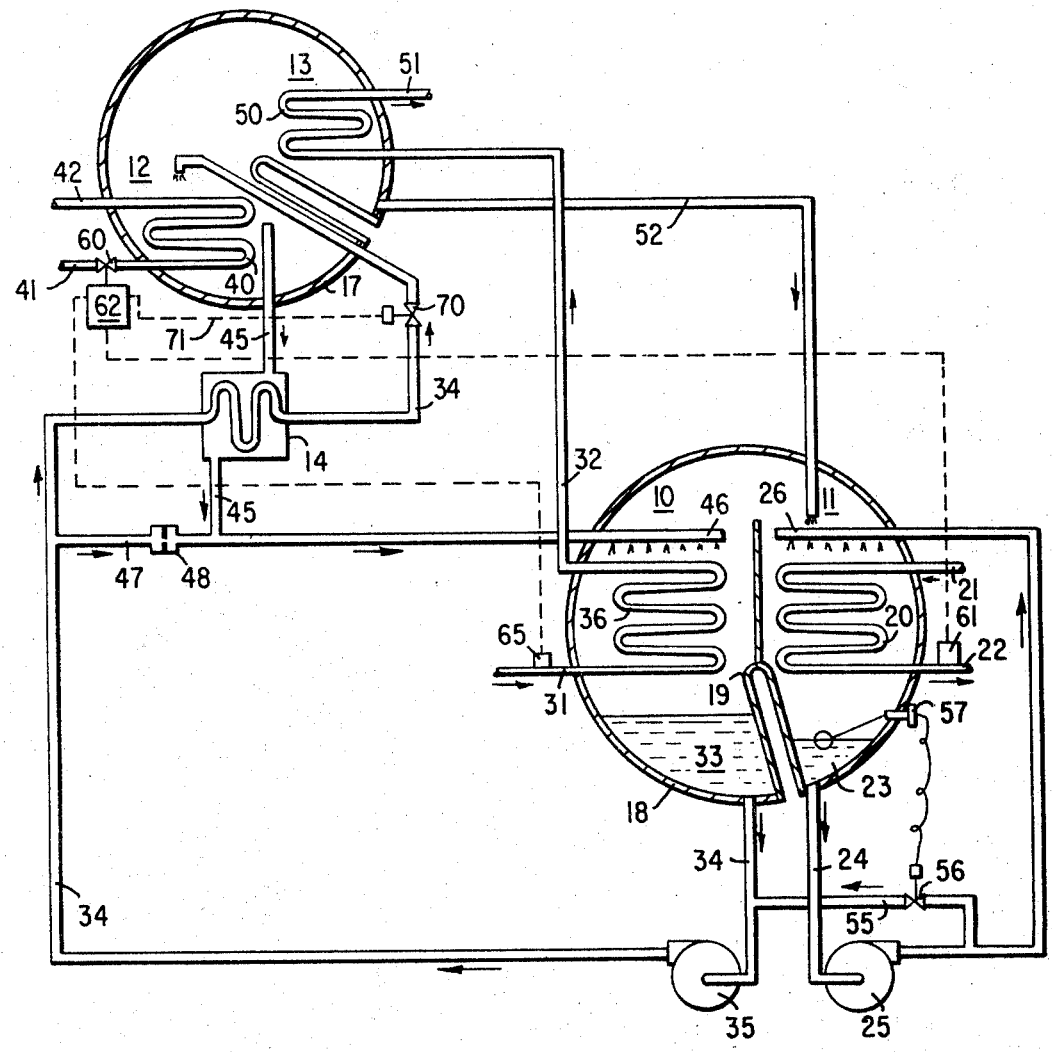

3,426,548
CAPACITY CONTROL FOR ABSORPTION REFRIGERATION SYSTEMS
John A. Greacen, Fayetteville, and Lawrence S. Beresik, East Syracuse, N.Y., assignors to Carrier Corporation, Syracuse, N.Y., a corporation of Delaware
Filed Nov. 13, 1967, Ser. No. 682,349
U.S. Cl. 62—101                                          12 Claims
Int. Cl. F25b 15/00, 39/00

ABSTRACT OF THE DISCLOSURE

A control system for an absorption refrigeration machine having a steam valve for modulating the heat input to the generator and a solution control valve arranged for stepwise adjustment of the quantity of strong solution cooled in the absorber. Both the steam valve and solution valve controls are responsive to the refrigeration demand imposed on the system, which is detected by sensing the temperature of chilled water leaving the evaporator. A dilution control is provided responsive to level of refrigerant in the evaporator to prevent over-concentration of the absorbent solution under conditions of low or uncontrolled entering condensing water temperature.

Background of the invention

This invention relates to a control system for an absorption refrigeration system having an evaporator, an absorber, a generator, a condenser and a solution heat exchanger.

In systems of the type described, it is desirable to regulate the refrigeration capacity of the system in order to provide a uniform chilled water temperature from the evaporator. In the past, a number of control systems have been proposed including many combinations of controls for varying heat input to the generator, solution flow to the generator, condensing water flow, and other conditions of operation of the system, in an attempt to achieve satisfactory capacity control. These prior control systems often necessitated sensing a plurality of disparate conditions of operation of the system, such as the temperature of strong solution leaving the generator, the condensing water temperature, condenser pressure, or solution concentrations, in addition to the leaving chilled water temperature from the evaporator in order to provide their control functions. It will be apparent that a change in any one of the conditions of temperature, pressure, solution flow or load in an absorption refrigeration machine is likely to effect all of the other conditions mentioned. Consequently, control systems which have attempted to regulate the various conditions of operation of the system in response to multiple conditions, have been likely to become unstable due to hunting of the controls in response to a prior change of a different control.

Two methods for controlling the capacity of an absorption refrigeration system have been widely used either alone or in combination with each other. The first method controls the heat input to the generator as a function of leaving chilled water temperature from the evaporator. The second method involves throttling the solution flow from the absorber to the generator in accordance with the leaving chilled water temperature to increase the efficiency of the system at light refrigeration loads. Throttling solution flow to the generator is highly desirable under conditions of low load, because less total volume of solution is heated in the generator, thus requiring less generator heat input and because the generator temperature tends to remain high which results in more preheating of the weak solution in the solution heat exchanger than if the temperature in the generator is allowed to drop at light loads.

However, prior control arrangements have been directed to controlling the generator capacity without recognizing the desirability for controlling the absorber capacity at the same time. For example, if the generator capacity is reduced without providing a corresponding reduction in the absorber capacity, the capability of the absorber to absorb refrigerant vapor may outstrip the available refrigerant supply in the evaporator. If the refrigerant supply in the evaporator drops too low, the suction head on the refrigerant pump may be reduced sufficiently to cause injury to the pump. If, on the other hand, the generator has excess capacity and the absorber capacity is reduced, there is the possibility that the absorbent solution may be overconcentrated in the generator and cause crystallization of absorbent elsewhere in the system. Consequently, large storage tanks have been required to prevent running out of solution in prior systems.

It is therefore a principal feature of this invention to provide a control system for an absorption refrigeration system wherein the capacity of both the generator and the absorber are proportionally controlled in a manner to provide stable and efficient operation of the system over a wide range of refrigeration loads.

Summary of the invention

In accordance with this invention, there is provided a control arrangement for an absorption refrigeration system having an evaporator, an absorber, a generator, and a condenser connected in a refrigeration circuit. A heating medium supply valve responsive to the temperature of chilled water leaving the evaporator controls the supply of heating medium to the generator. A solution control valve regulates the supply of weak absorbent solution from the absorber to the generator in accordance with the temperature of chilled water leaving the evaporator. For example, the solution valve may sense the position of the heating medium valve to throttle the solution flow to the generator when the heating medium valve has closed below a predetermined position. Since both control valves are responsive ultimately to the leaving chilled water temperature from the evaporator, stable operation of the system is achieved without the complication of sensing a plurality of varying conditions and reducing the likelihood of severe hunting in the control system characteristic.

The generator is designed with suitable weir outlet means so that throttling the supply of weak solution to the generator in turn proportionally decreases the flow of strong solution to the absorber. The absorber is designed so that reducing the supply of strong solution passing to the absorber reduces the total quantity of solution cooled by the absorber heat exchanger, and thus correspondingly reduces the capacity of the absorber to absorb refrigerant vapor. In the preferred embodiment, the reduction of the absorber capacity is achieved by passing the strong solution from the generator directly over the absorber heat exchanger without providing an absorber recirculation pump.

A control system in accordance with this invention varies generator and absorber capacity simultaneously in response to the refrigeration demand imposed on the system for stability of operation, while varying solution flow to the generator for economy of operation.

Brief description of the drawing

The drawing illustrates a cross sectional schematic flow diagram of an absorption refrigeration system illustrating a preferred embodiment of this invention.

Description of the preferred embodiment

Referring to the drawing, there is shown an absorption refrigeration system comprising an absorber 10, a refrigerant evaporator 11, a generator 12, a refrigerant condenser 13, and a solution heat exchanger 14 arranged in a refrigeration circuit. Absorber 10 and refrigerant evaporator 11 are preferably disposed side by side in a common shell 18 and are separated by a partition 19. Similarly, generator 12 and condenser 13 may be disposed in a common shell 17.

A suitable refrigerant for the system described is water and a suitable absorbent solution is a hygroscopic, aqueous solution of lithium bromide. As used herein, the term "strong" solution describes a concentrated solution of absorbent which is strong in absorbing power, and the term "weak" solution is used to describe a dilute solution of absorbent which is weak in absorbing power.

Evaporator 11 comprises an evaporator heat exchanger 20 for the circulation therethrough of a fluid medium, such as water, being cooled by heat exchange relation with evaporating refrigerant. The fluid is chilled by passage through heat exchanger 20 and is circulated through outlet passage 22 to a suitable remote heat exchanger (not shown) where it absorbs heat from a refrigeration load. The fluid medium is then returned to the evaporator through inlet line 21 for recooling. The lower portion of the evaporator between shell 18 and partition 19 forms a refrigerant sump 23 for the accumulation of unevaporated refrigerant. Refrigerant recirculation passage 24 and refrigerant pump 25 convey refrigerant to spray headers 26 which discharge liquid refrigerant over evaporator heat exchanger 20 to absorb heat from the fluid being cooled.

Absorber 10 comprises an absorber heat exchanger 36 having an inlet passage 31 and an outlet passage 32 for passing a cooling medium in heat exchange relation with absorbent solution to cool the absorbent solution and to promote absorption of refrigerant vapor into the solution. The cooling medium is preferably water, which has been cooled by evaporation in a cooling tower (not shown). The lower portion of absorber 10 between partition 19 and shell 18 comprises an absorber sump 33 for the accumulation of absorbent solution. Solution from absorber sump 33 passes through weak solution passage 34 and is pumped by weak solution pump 35 through the interior passage of solution heat exchanger 14 to generator 12 for concentration therein.

Generator 12 comprises a generator heat exchanger 40 having an inlet passage 41 and an outlet passage 42 for passing a heating medium in heat exchange relation with absorbent solution in the generator. In the embodiment illustrated, the heating medium is preferably steam, although it will be appreciated that other media, such as hot water or combustion gas from a gas burner may be employed. The absorbent solution in the generator is concentrated by boiling the vaporized refrigerant from the weak solution, thereby forming a strong absorbent solution. The strong absorbent solution is discharged from the generator through strong solution passage 45. For illustration, the strong solution passage has been shown to extend a substantial height above the bottom of shell 17 to maintain a level of solution in the generator, although other weir arrangements to achieve the same result may be employed.

The hot strong solution from generator 12 passes via strong solution passage 45 through the exterior passage of solution heat exchanger 14 and is discharged through absorber spray header 46 over absorber heat exchanger 36. The strong solution preheats the weak solution in heat exchanger 14 to reduce the heat input required in the generator, thereby cooling the strong solution. The cooled strong solution is then further cooled in absorber 10 by heat exchange with the cooling medium passing through absorber heat exchanger 36 to promote the absorption of refrigerant vapor into the strong solution.

A weak solution bleed passage 47 having a suitable restriction 48 therein is disposed to bleed a small quantity of weak solution from weak solution passage 34 into strong solution passage 45 to increase the quantity of solution passing through spray headers 46 sufficiently to obtain complete wetting of absorber heat exchanger 36 under full load operating conditions.

Condenser 13 comprises a condenser heat exchanger 50 having an inlet connected to outlet passage 32 from absorber heat exchanger 36, and having an outlet 51 for the passage of cooling medium through the condenser heat exchanger. The cooling medium, preferably water, is passed from absorber heat exchanger 36 through condenser heat exchanger 50, through passage 51, to a cooling tower (not shown), where it is cooled and returned via passage 31. Refrigerant vapor separated from absorbent solution in generator 12 passes into condenser 13 in heat exchange relation with the cooling medium, thereby condensing the refrigerant vapor. The condensed refrigerant passes through refrigerant liquid passage 52 into sump 23 of evaporator 11 and is sprayed over evaporator heat exchanger 20 to cool the refrigeration load.

A dilution control system is preferably incorporated to prevent over-concentration of absorbent solution, particularly under conditions of low entering cooling medium to prevent crystallization of absorbent solution in the solution heat exchanger or in the absorber. The dilution control comprises a dilution line 55 having a dilution valve 56 therein. Dilution line 55 extends between the discharge of refrigerant pump 25 and the inlet of weak solution pump 35. A refrigerant float control 57 is disposed in sump 23. Float control 57 is arranged to electrically, pneumatically or mechanically open dilution valve 56 upon accumulation of refrigerant in sump 23 in excess of a predetermined level.

In accordance with this invention, a heating medium control valve 60 is disposed in inlet line 41 to generator heat exchanger 40 and arranged to control the passage of heating medium to the generator. A temperature sensor 61 is secured at a suitable location, such as line 22, to provide a control signal which is a function of the refrigeration demand imposed on the system. It will be appreciated that the temperature of chilled water leaving evaporator 11 through line 22 or the temperature within the evaporator is a function of the heat being absorbed from the refrigeration load. Thus, temperature sensor 61 is responsive to the demand imposed on the system. Sensor 61 provides an electrical, pneumatic or mechanical control signal to operate a suitable control relay 62 for positioning heating medium valve 60. In the case of a pneumatic control system, control relay 62 may comprise a pneumatic relay of conventional design.

A limit control including a temperature sensor 65 sensing the temperature of cooling medium entering absorber heat exchanger 36 may be connected to control relay 62 to limit the opening of heating medium valve 60 under conditions of entering cooling medium below a predetermined temperature. For example, in a pneumatic system, sensor 65 may provide a control signal to a pneumatic relay in control 62 which serves to reset the control temperature of the pneumatic relay to a higher effective chilled medium or evaporator temperature. This prevents heating medium to the generator under conditions of low absorber and condenser temperature to prevent excessively violent boiling of absorbent solution in the generator and carryover into the condenser. This control, therefore, reduces the need for expensive eliminators between the generator and the condenser.

A solution control valve 70 is disposed in weak solution line 34, preferably between the outlet of heat exchanger 14 and generator 12. If heating medium valve 60 is of the modulating type, solution control valve 70 may be of the stepwise adjustment type, having two or more conditions of solution flow restriction. Alternatively, heating medium valve 60 may be of the stepwise adjustment type and solution control valve 70 may be of the modulating type. Solution valve 70 is connected by a control line 71 to a suitable control signal source, such as control relay 62, to position the solution valve in accordance with the refrigeration demand imposed on the system. Various methods of positioning valve 70 are envisioned within the scope of this invention. For example, in a pneumatic system, line 71 may be a pneumatic line which senses the control signal pressure provided to valve 60, which is derived from temperature sensor 61. Valve 70 is arranged to reduce the solution flow to the generator when the signal to heating medium valve 60 is reduced below a predetermined level indicative of a light refrigeration load on the system. Valve 70 may be mechanically connected to sense the mechanical position of valve 60, which in turn is responsive to the temperature sensed by temperature sensor 61 and arranged so that when the heating medium valve closes below a predetermined position, valve 70 closes to a reduced solution flow condition. Alternatively, valve 60 may sense the position of valve 70 which in turn may be directly responsive to temperature sensor 61. Various other modifications of the control arrangement are within the scope of this invention, whereby both the heating medium valve and the solution control valve are ultimately responsive to the refrigeration demand imposed on the system.

The operation of a control system in accordance with this invention will be described on the assumption that the refrigeration system has been operating at a relative high load condition, and the operation has stabilized to provide the desired leaving chilled medium temperature in line 22 from heat exchanger 20. Under these conditions, a pneumatic or other signal from sensor 61 will be passed to control relay 62 and from there to heating medium valve 60 to maintain the heating medium valve at the proper flow restriction condition which provides a heating medium flow condition to maintain the desired chilled medium temperature. Under these conditions, because the refrigeration system is operating at relatively high load, solution valve 70 will be at its minimum flow restriction condition, which will result in a maximum solution flow condition of strong absorbent solution from generator 12 through line 45 and spray header 46 over absorber heat exchanger 36. Also, under these conditions, the refrigerant level in sump 23 will be low enough so that dilution valve 56 is closed.

Assuming the refrigeration load at the remote heat exchanger (not shown) suddenly drops, the temperature of the cooling medium entering evaporator coil 20 will drop and cause a corresponding drop in the temperature sensed in line 22 by temperature sensor 61. The decreased temperature at sensor 61 will provide a signal to control relay 62 which in turn will cause heating medium valve 60 to close to a more restricted flow condition providing less heating medium to generator 12. If the load on the remote heat exchanger drops below a predetermined value, as sensed by sensor 61, heating medium valve 60 will close down to the predetermined position at which solution valve 70 will assume a maximum flow restriction condition providing a minimum solution flow rate. For example, when the temperature sensed by sensor 61 indicates that the load on the refrigeration system has dropped to about fifty percent of full load capacity, heating medium valve 60 may throttle a twelve pound steam pressure in passage 41 down to about four pounds per square inch gage pressure. When valve 60 has closed down to this position, solution valve 70 will sense the restricted flow rate or load condition and will throttle solution flow in a single step to about fifty percent of the solution flow under higher load conditions.

Under the low load refrigeration condition, less weak absorbent solution is supplied to generator 12 than under a high load condition. Consequently, the quantity of solution returning over the weir means through line 45 will be substantially reduced. The reduction in strong solution passing through line 45 will in turn result in lesser quantity of absorbent solution passing through spray headers 46 over absorber heat exchanger 36. Since less solution is being cooled by absorber heat exchanger 36 under these conditions, the capacity of the absorber to absorb refrigerant vapor is substantially reduced. Therefore, the absorber and the generator are simultaneously reduced in capacity proportionally to each other, so that the absorber does not tend to absorb excessive quantity of refrigerant vapor. Therefore, the evaporator is not in danger of running out of refrigerant to an extent which might cause damage to refrigerant pump 25.

It will be seen that the varying of the absorber capacity, in accordance with this invention, is achieved by varying the total quantity of strong absorbent solution passing absorber heat exchanger 36. In practice, the area of absorber heat exchanger 36, which is wetted with solution, is reduced when a lesser volume of absorbent solution passes through spray header 46.

It will also be seen that prior absorption refrigeration systems, which utilize an absorber recirculation pump, do not reduce the total volume of absorbent solution passing over the absorber heat exchanger or cooled by it, and consequently, the capacity of the absorber to absorb refrigerant vapor was not necessarily reduced by a reduction in the strong solution flow to the absorber. Such systems were therefore not capable of adequately throttling the absorber capacity. Such prior systems often required large refrigerant storage vessels to prevent the evaporator from running out of refrigerant under conditions of operation where solution flow to the generator was reduced.

It will also be seen that throttling the flow of solution to the generator as well as the steam to the generator, effect all of the advantages in economy of part-load operation which inure in reducing the quantity of solution which is heated in the system, while at the same time, reducing the solution cooled by the absorber heat exchanger provides the additional advantage of throttling the absorber capacity and preventing over-dilution of the refrigeration system.

Furthermore, since both the heating medium supplied to the generator and the weak solution supplied thereto as well as the strong solution passing over the absorber heat exchanger are all varied in response to the same condition of operation of the system, namely the load imposed on the system, a stable control characteristic is achieved and problems of excessive hunting are reduced.

While a preferred embodiment of this invention has been described, for purpose of illustration, it will be apparent that the invention may be otherwise embodied within the scope of the following claims.

We claim:
1. An absorption refrigeration system comprising:
(A) an evaporator including an evaporator heat exchanger for evaporating refrigerant in heat exchange relation with a fluid medium being cooled;
(B) an absorber including an absorber heat exchanger for passing absorbent solution in heat exchange relation with a cooling medium to promote absorption of refrigerant vapor from the evaporator into absorbent solution in the absorber;
(C) a generator including a generator heat exchanger for passing heating medium in heat exchange relation with absorbent solution to concentrate the solution by vaporizing refrigerant therefrom;
(D) a condenser including a condenser heat exchanger for passing a cooling medium in heat exchange relation with refrigerant vaporized in the generator to condense the refrigerant;
(E) weak solution passage means for passing weak absorbent solution from the absorber to the generator for concentration therein;
(F) strong solution passage means for passing strong absorbent solution from the generator to the absorber for absorption of refrigerant vapor therein;

wherein the improvent comprises:
 (G) demand sensing means for sensing the refrigeration demand imposed on said system and for providing a control signal functionally related thereto;
 (H) heat control valve means for varying the capacity of said generator by regulating the supply of heating medium to said generator heat exchanger in response to the control signal provided by said demand sensing means; and
 (I) solution control valve means for varying the capacity of said absorber by regulating the quantity of absorbent solution cooled by heat exchange with said cooling medium in the absorber in response to the control signal provided by said demand sensing means.

2. An absorption refrigeration system as defined in claim 1 wherein:
 (A) the flow restriction condition of said heating valve means is responsive to a temperature of the fluid medium passing through the evaporator heat exchanger to be cooled; and
 (B) said solution flow control valve means comprising a solution valve having a plurality of flow restriction conditions, said solution valve including means for automatically selecting a predetermined flow restriction condition in accordance with the sensed temperature of fluid medium passing through the evaporator heat exchanger.

3. An absorption refrigeration system as defined in claim 1 wherein:
 (A) said heat control valve means is a modulating valve having a flow restriction condition which is functionally related to the refrigeration demand sensed by said demand sensing means;
 (B) said solution control valve is disposed in said weak solution passage for controlling flow of weak soltuion from the absorber to the generator to thereby control passage of strong solution from the generator to the absorber; and
 (C) said solution flow control valve means is a control valve having at least two flow restriction conditions for adjusting the solution flow from at least a maximum solution flow condition to a minimum flow condition in response to a demand imposed on said system below a predetermined demand.

4. An absorption refrigeration system as defined in claim 1 wherein said solution control valve includes means for sensing the flow restriction condition of said heat control valve means to control said solution valve in response to the control signal provided by said demand sensing means.

5. An absorption refrigeration system as defined in claim 1 wherein
 (A) said heat control valve means is a modulating valve having a flow restriction condition functionally related to the refrigeration demand sensed by said demand sensing means; and
 (B) said solution control valve means is a fluid control valve having at least a maximum solution flow condition and a minimum solution flow condition, and including means to select said solution flow conditions in response to the refrigeration demand imposed on said system.

6. An absorption refrigeration system as defined in claim 1 wherein:
 (A) said heat control valve means is a control valve having a plurality of flow restriction conditions which are functionally related to the refrigeration demand sensed by said demand sensing means; and
 (B) said solution flow valve means is a modulating control valve for adjusting the solution flow from a maximum solution flow condition to a minimum flow condition in response to the refrigeration demand sensed by said demand sensing means.

7. An absorption refrigeration system as defined in claim 1 including:
 (A) cooling medium sensing means for sensing a temperature functionally related to the temperature of cooling medium passing through said absorber heat exchanger; and
 (B) control means for limiting reduction in the fluid flow restriction presented by said heat control valve means upon sensing of a cooling medium temperature below a predetermined temperature to thereby prevent excessive concentration of absorbent solution in the generator during periods of low cooling medium temperature.

8. An absorption refrigeration system as defined in claim 1 including:
 (A) said demand sensing means being disposed to sense a temperature of the fluid medium being cooled by said evaporator, and said heat control valve means being responsive to the sensed temperature of the fluid medium being chilled so as to regulate the temperature thereof;
 (B) cooling medium sensing means for sensing a temperature functionally related to the temperature of cooling medium passing through said absorber heat exchanger; and
 (C) control means for resetting the regulated temperature maintained by said heat control valve to a higher temperature in response to a cooling medium temperature being sensed by said sensing means below a predetermined temperature so as to avoid excessive concentration of strong solution in the generator at low cooling medium temperatures.

9. A method of producing refrigeration from an absorption refrigeration system having an evaporator for cooling a fluid medium by evaporating refrigerant, an absorber having an absorber heat exchanger for absorbing refrigerant evaporated in the evaporator into an absorbent solution, a generator having a generator heat exchanger for concentrating absorbent solution by heating the absorbent solution and vaporizing refrigerant therefrom, and a condenser for condensing refrigerant vaporized in the generator, comprising the steps of passing absorbent solution from the generator to the absorber into heat exchange relation with a cooling medium in the absorber, thereby cooling said absorbent solution and promoting absorption of refrigerant vapor therein; passing absorbent solution from the absorber to the generator into heat exchange with a heating medium in the generator, thereby heating the absorbent solution and separating refrigerant therefrom; wherein the improvement comprises controlling the refrigeration capacity of the system by:
 (A) sensing the refrigeration demand imposed on said system;
 (B) varying the heat input to the generator in response to the sensed refrigeration demand imposed on said system; and
 (C) varying the quantity of absorbent solution cooled in the absorber by varying the quantity of absorbent solution passing in heat exchange relation with the cooling medium, the quantity of absorbent solution being cooled being varied in response to the sensed refrigeration demand imposed on said system.

10. A method of producing refrigeration as defined in claim 9 wherein the quantity of absorbent solution cooled in the absorber is varied by controlling the flow of absorbent solution from the absorber to the generator in response to the sensed refrigeration demand imposed on the system, to thereby proportionally vary the quantity of absorbent solution passing from the generator to the absorber and being cooled therein.

11. A method of producing refrigeration as defined in claim 9 wherein the step of varying the quantity of absorbent solution cooled in the absorber includes varying the area of absorber heat exchanger surface wetted with absorbent solution in accordance with the refrigeration demand imposed on the system.

12. A method of producing refrigeration as defined in claim 9 including the steps of sensing the temperature of cooling medium supplied to the absorber, and limiting the supply of heating medium to the generator in response to sensing of a predetermined cooling medium temperature below a predetermined temperature.

No references cited

LLOYD L. KING, *Primary Examiner.*

U.S. Cl. X.R.

62—148, 476

UNITED STATES PATENT OFFICE
CERTIFICATE OF CORRECTION

Patent No. 3,426,548

February 11, 1969

John A. Greacen et al.

It is certified that error appears in the above identified patent and that said Letters Patent are hereby corrected as shown below:

Column 7, line 22, "comprising" should read -- comprises --; line 70, before "valve" insert -- control --.

Signed and sealed this 31st day of March 1970.

(SEAL)
Attest:

Edward M. Fletcher, Jr.
Attesting Officer

WILLIAM E. SCHUYLER, JR.
Commissioner of Patents